Sept. 17, 1935.  L. J. CLAYTON  2,014,468
MACHINE FOR CONTINUOUS MOLDING OF HOLLOW RUBBER ARTICLES
Filed Feb. 20, 1933  4 Sheets-Sheet 1
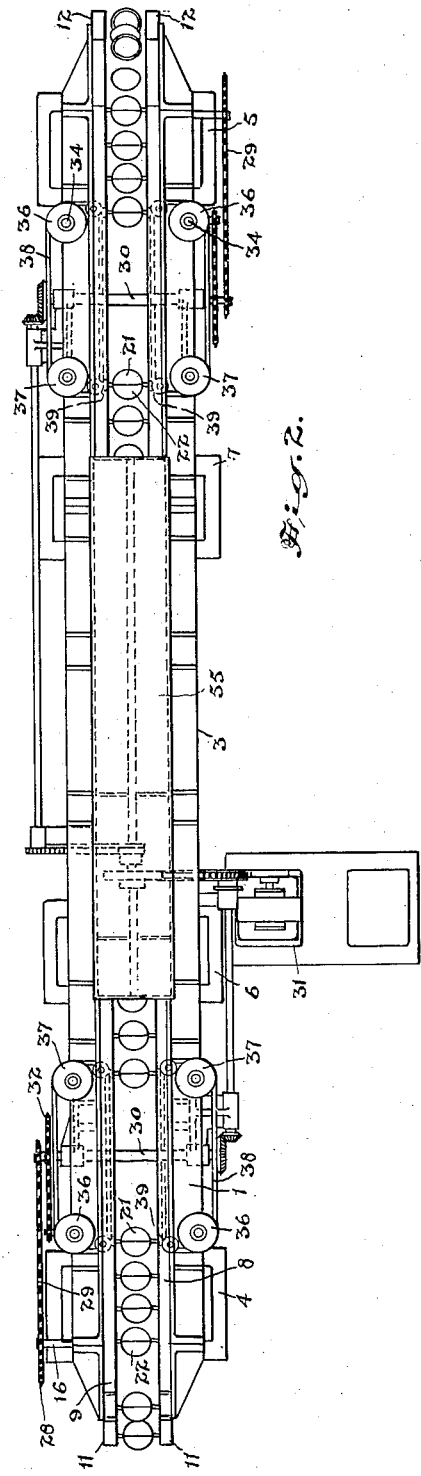
Inventor.
Lewis J. Clayton Sept. 17, 1935. L. J. CLAYTON 2,014,468
MACHINE FOR CONTINUOUS MOLDING OF HOLLOW RUBBER ARTICLES
Filed Feb. 20, 1933 4 Sheets-Sheet 2

Inventor:
Lewis J. Clayton.

Sept. 17, 1935.  L. J. CLAYTON  2,014,468
MACHINE FOR CONTINUOUS MOLDING OF HOLLOW RUBBER ARTICLES
Filed Feb. 20, 1933   4 Sheets-Sheet 3
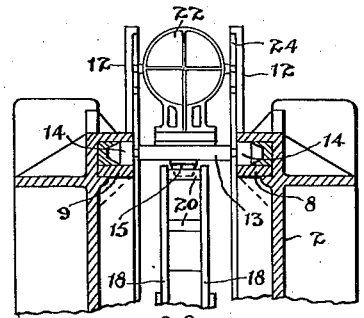
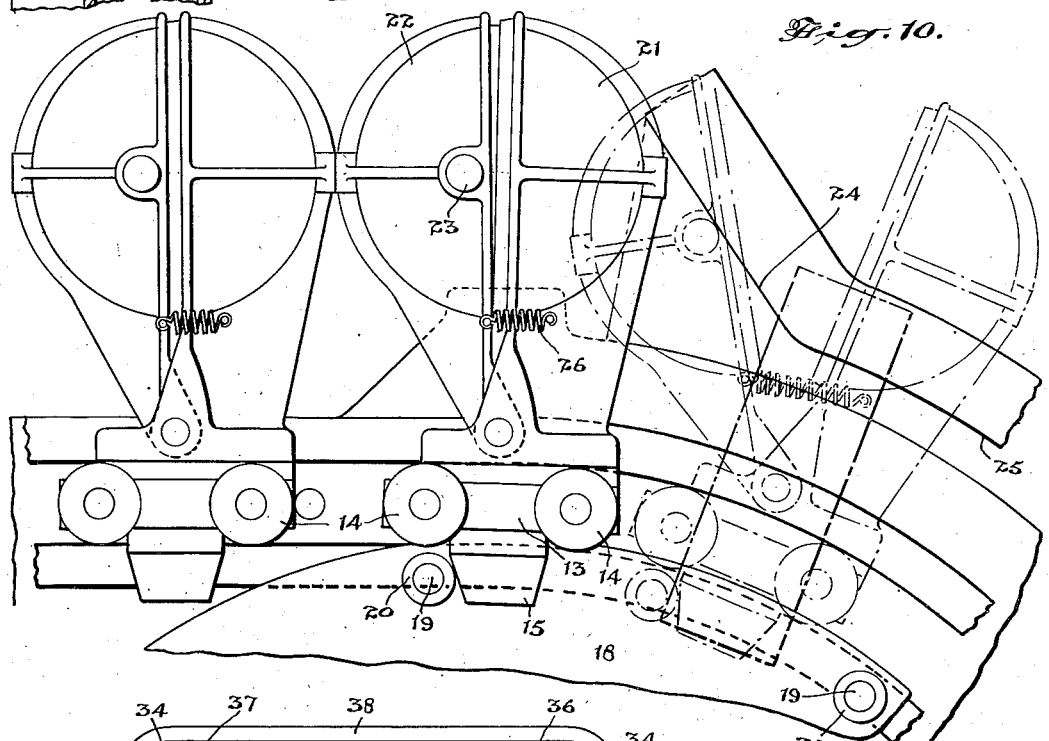
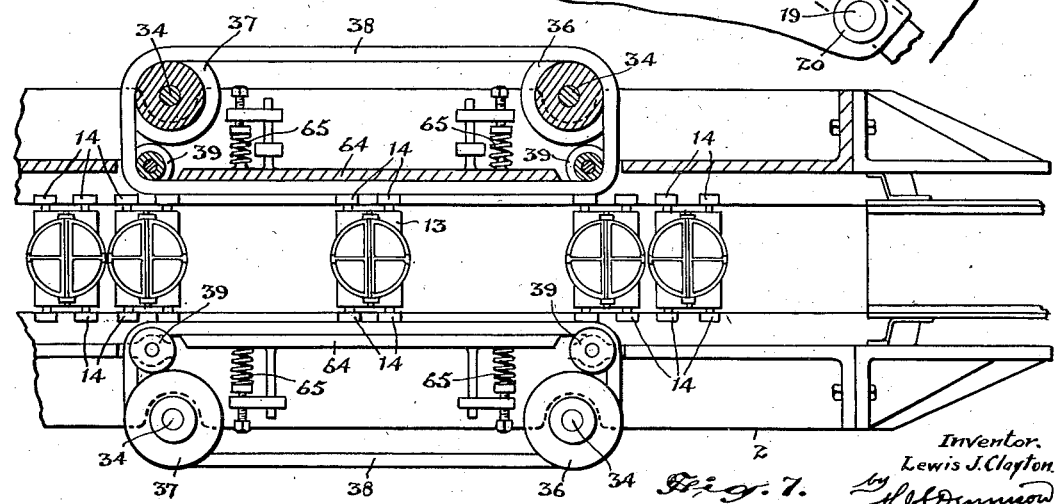
Inventor.
Lewis J. Clayton Sept. 17, 1935.   L. J. CLAYTON   2,014,468
MACHINE FOR CONTINUOUS MOLDING OF HOLLOW RUBBER ARTICLES
Filed Feb. 20, 1933   4 Sheets-Sheet 4
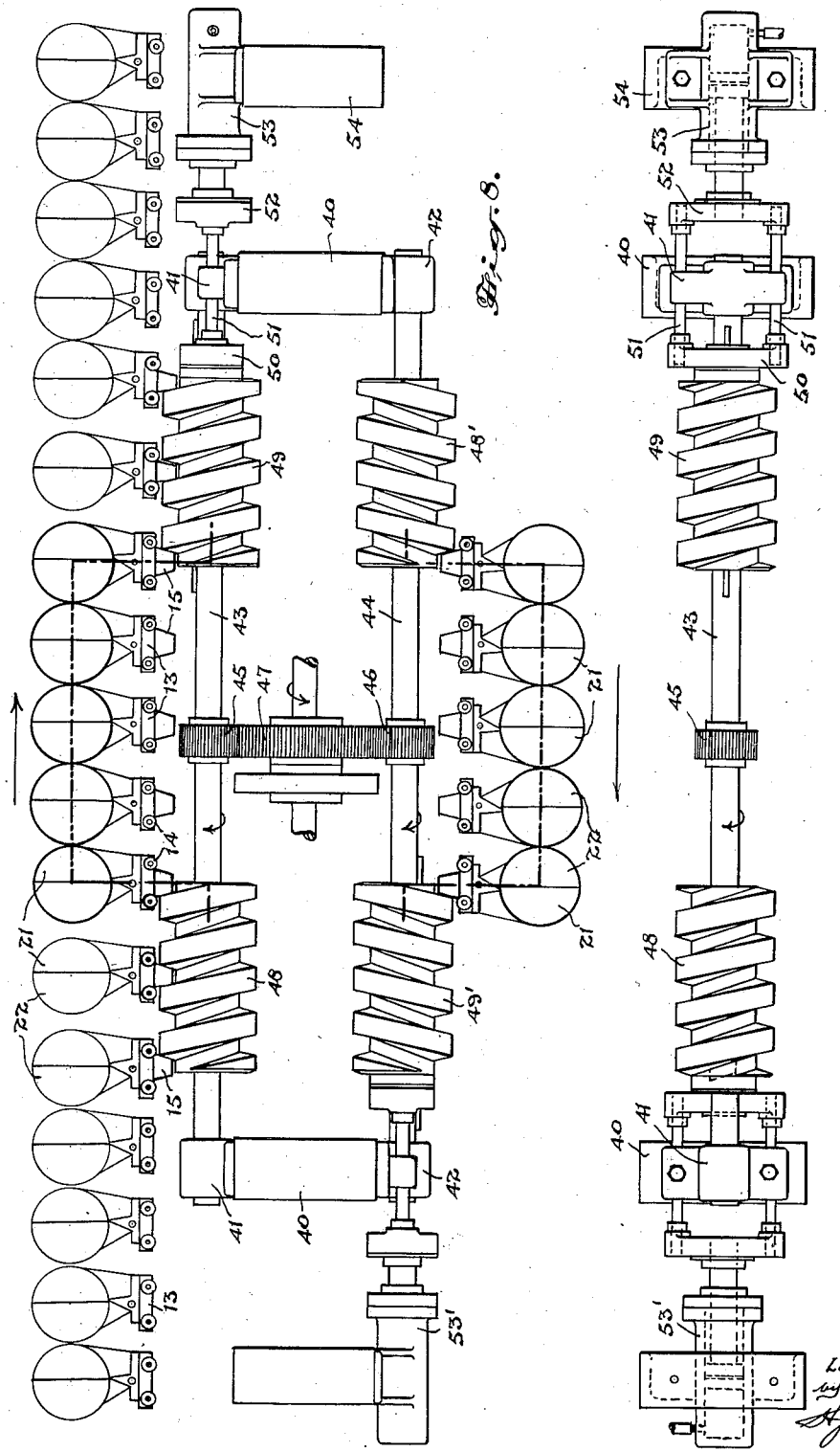
Inventor.
Lewis J. Clayton.

Patented Sept. 17, 1935

2,014,468

UNITED STATES PATENT OFFICE 2,014,468

MACHINE FOR CONTINUOUS MOLDING OF HOLLOW RUBBER ARTICLES

Lewis J. Clayton, Toronto, Ontario, Canada, assignor to The Viceroy Manufacturing Company, Limited, Toronto, Ontario, Canada Application February 20, 1933, Serial No. 657,611

15 Claims. (Cl. 18—4)

The principal objects of this invention are, to facilitate the manufacture of molded hollow rubber articles, such as play balls which are gas inflated, and to produce such articles in quantities at a minimum cost.

A further and important object is to devise a machine in which a plurality of molds are progressively and continuously operated to produce the finished articles with the minimum of handling, and further to provide a machine which may be altered to vary its capacity.

The principal features of the invention consist in the novel construction of a frame having a continuous trackway therein in which a plurality of molds are progressively and continuously operated through the charging, closing, heating, cooling and discharging periods.

A further and important feature consists in the novel manner of effecting the progression of the molds through a heat applying section, while maintaining a uniform pressure thereon to retain the molds closed.

A still further feature of importance in this invention consists in the novel compact self-contained unitary structure of the mechanism.

In the accompanying drawings, Figure 1 is a side elevational view of a machine constructed in accordance with this invention.

Figure 2 is a plan view.

Figure 6 is a part sectional elevational detail taken on the line 6—6 of Figure 3.

Figure 7 is an enlarged plan view of the flexible belt accelerator pick up for the molds arranged adjacent to each end.

Figure 8 is an enlarged diagrammatic side elevational view showing the pressure means for driving the molds through the heating section.

Figure 9 is a plan view of the arrangement shown in Figure 8.

Figure 10 is a much enlarged side elevational view of a pair of molds shown approaching the opening cam with a mold being opened, shown in dotted lines.

Figure 4:
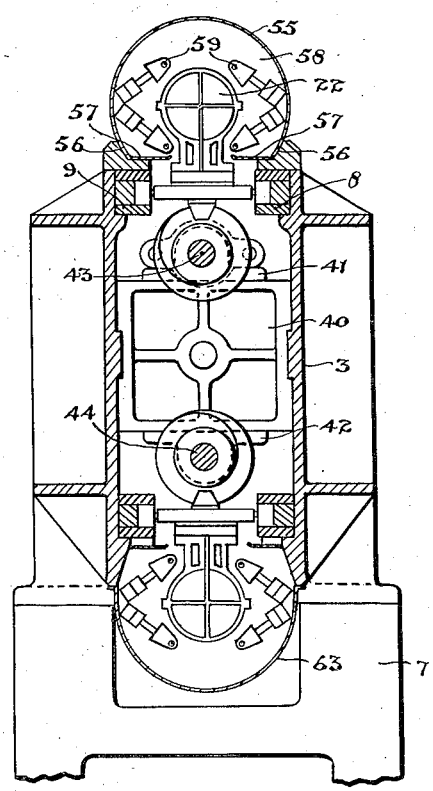
Figure 4 is an enlarged vertical mid sectional view taken through the line 4—4 of Figure 1.

The structure herein shown comprises a plurality of frame sections 1, 2 and 3, the end sections 1 and 2 being supported at their outer ends on the standards 4 and 5 respectively and at their inner ends by the standards 6 and 7 which also support the ends of the middle section 3.

Parallel longitudinal trackways 8 and 9 are formed on the inner sides of the frames at the top and bottom respectively and these are connected at the ends to form endless trackways by semi-circular trackways formed on the inner walls of the semi-circular end extensions 11 and 12.

A plurality of mobile blocks 13 are arranged between the parallel side frames, each being provided with a pair of rollers 14 at each side which extend into running engagement with the endless trackways.

Secured to or extending inwardly from each of the blocks 13 is a stud 15 which is preferably of slightly tapering form. Mounted between the end extensions 11 and 12 upon the shafts 16 and 17 respectively are the double discs 18 and between the discs of each of these rotatable members are arranged a plurality of pins 19 upon which are mounted the rollers 20 and these rollers are adapted to engage the studs 15 to push the blocks around the semi-circular end portions of the trackways at a predetermined spacing.

Each of the blocks 13 has rigidly mounted thereon a mold section 21 having a hemispherical mold cavity, and pivotally mounted on each of said blocks is a mating mold section 22, also having a hemispherical cavity and these paired mold sections are adapted to close together having interesting flanged edges.

Pins 23 are rigidly secured to the pivotal mold sections adjacent to the axis of the hemispherical mold portions and these pins extending laterally are adapted to engage a sloping cam surface 24 formed on either side of the inner walls of the end extensions 11 and 12.

These cam surfaces lead inwardly to a circumferential groove 25 and are adapted to engage the pins 23 to swing the pivotal mold sections away from the rigid mold sections as the blocks 13 are carried around the end extensions by the rotatable discs 18.

Coiled tension springs 26 are arranged to connect the pivotal mold sections to the rigid sections and to draw the pivotal sections back to the closed position when such pivotal mold sections are released.

The grooves 25 are formed with outwardly flaring end surfaces 27 at the opposite ends of the cam surfaces 24.

The shafts 16 and 17 each have provided on one end a pulley or sprocket wheel 28 which is engaged by a belt or chain 29, which in turn is operated by a pulley or sprocket on a shaft 30 journalled in the end sections 1 and 2 intermediate of their length and midway of their height.

Both of the cross shafts 30 are operatively connected through a suitable train of shafts and gearing to a motor 31 arranged at one side of the machine.

Mounted on each of the cross shafts 30 is a sprocket or pulley 32 which drives a chain or belt operating a set of bevelled gears 33 which connect with a pair of aligned vertical shafts 34 and 35 extending above and below the bevelled gears.

Upon the end of each of the shafts 34 and 35 is mounted a pulley 36 and spaced longitudinally of the end sections 1 and 2 toward the inward ends thereof and on each side are pulleys 37.

Flexible endless belts 38 extend around each set of pulleys 36 and 37 and these are carried around rollers 39 arranged in openings in the end sections 1 and 2 and guide the belts in a straight line on the inner side of the frame sections to run lengthwise of the trackways therein.

The upper pairs of belts at each end are arranged to travel in one direction, while the lower pairs of belts at each end travel in the opposite direction and the inner faces of these belts are adapted to engage the end faces of the rollers 14 which support the blocks 13 from the runways, said belts operating the blocks along a length of the frame with a quick transfer movement.

Between the end frame sections 1 and 2 midway of their length and midway between the top and bottom trackways are secured the frames 40, upon the top and bottom of which are mounted the journal blocks 41 and 42 respectively.

A shaft 43 extending longitudinally of the machine is journalled in the upper journal blocks 41 and a shaft 44 is journalled longitudinally of the machine in the journal blocks 42.

Upon these shafts are mounted the spur pinions 45 and 46 respectively and these pinions mesh with a spur gear 47 mounted on a jack shaft which is driven by a suitable gearing from the motor 31.

Rigidly mounted upon the shaft 43 adjacent to one end thereof is a spiral driving member 48, the spiral grooves of which are adapted to receive the studs 15 extending inwardly from the blocks 13 as said blocks travel along the trackways and in rotating, said spiral members propel the blocks and the molds carried thereby longitudinally.

Upon the same shaft and adjacent to the opposite end is slidably and non-rotatably mounted a spiral 49.

A block 50, rotatably encircling the shaft 43 at one end of the longitudinally movable spiral 49, is supported by a pair of rods 51 parallelly mounted to slide in bearings on the frame 40. These rods are connected together at their opposite end by a cross head 52 which is connected with a hydraulic ram 53 mounted on a block 54 secured between the frame sections.

The cylinder of the ram 53 is connected with a suitable hydraulic pressure supply so that pressure will be constantly exerted to hold the spiral member 49 to its inward position, but it will yield to excess pressure.

The lower shaft 44 is provided with a similar arrangement of spiral members 48' and 49' and the slidable spiral member 49' is operated by the ram 53' similarly arranged.

A part cylindrical casing 55, preferably formed of sheet metal and having a highly reflective inner surface, is mounted on the top of the frame extending the full length of the middle section C and slightly over the ends of the end sections 1 and 2 adjoining the middle section.

Figure 5:
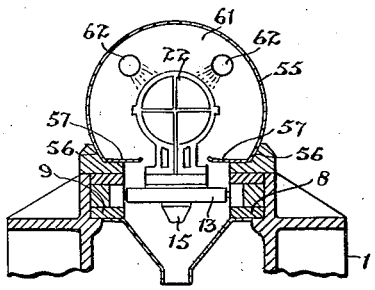
Figure 5 is a sectional view of similar proportions to Figure 4, taken on the line 5—5 of Figure 1.
Figure 3:
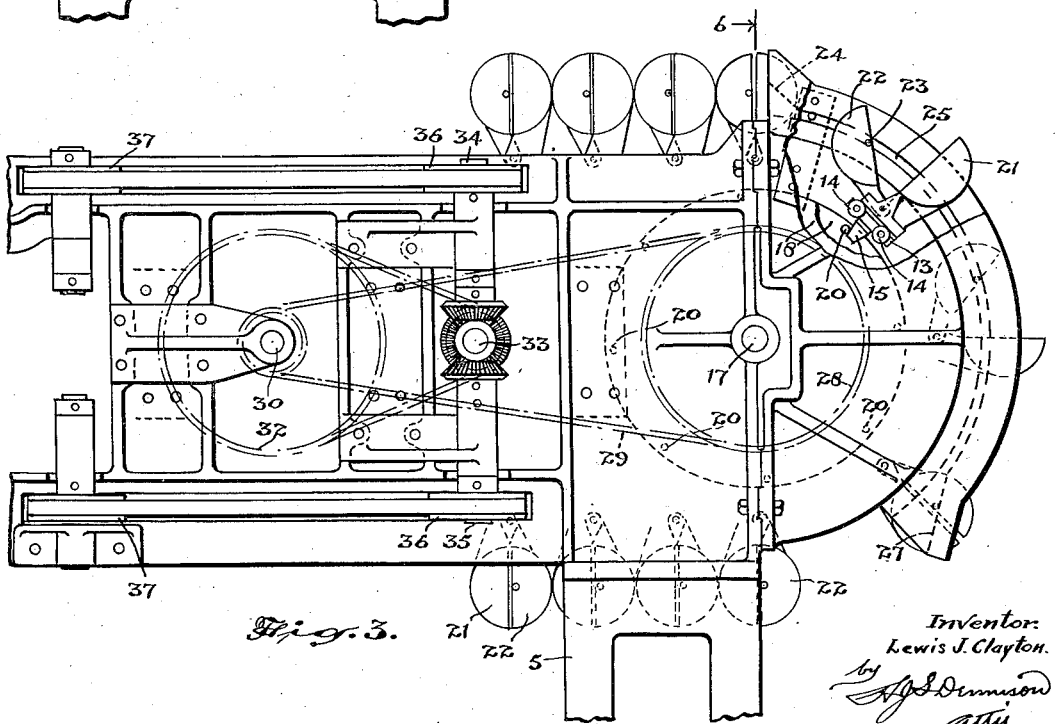
Figure 3 is an enlarged elevational view of one end of the machine.

This casing as illustrated in Figures 4 and 5 fits snugly into the longitudinal grooves 56 formed along the top edges of the frame sections and the edges of the casing are turned inwardly forming the flanges 57 which extend close to the upright portions of the mold structures to enclose a heat chamber 58 surrounding the molds as they travel throughout the length of the central portion of the machine.

Within the heat chamber 58 are arranged a plurality of radiant electric heating elements 59, the rays from which impinge directly upon the molds and are reflected inwardly toward the molds from the burnished surface of the casing 55.

A portion of the interior of the casing 55 is separated from the heat chamber by a partition 60 forming a cooling chamber 61 within which are arranged a plurality of spraying devices 62 for spraying a cooling liquid over the molds as they pass therethrough.

A casing 63 precisely similar to the casing 55 is arranged on the underside of the machine having a cooling chamber at one end and fitted with heating elements and cooling devices in the reverse location to those of the upper casing.

It will be readily understood from this description that this machine is double-acting, that is to say, it operates in a similar manner from both ends.

At either end of the machine the studs 15 of the mold carriers or blocks 13 are engaged by the rollers 20 of the rotatable discs 18. The laterally extending pins 23 on the hinged mold sections engage the bevelled surface of the cam 24 and the mold is open, permitting the removal of a finished article.

A fresh charge of material, preferably a "biscuit" of rubber material containing a suitable quantity of a gas-producing substance is placed in the open mold by the operator. As the mold is carried around, the hinged section is held open by the pins 23 travelling in the concentric groove 25, but when the pins reach the ends of the groove the tension springs 26 swing the pivotal section to the closed position. The molds then rest in the trackways and as each succeeding mold is delivered from the roller disc, they push the train of molds along until one at a time the rollers carrying the mold blocks 13 come in contact with the endless friction belts 38 arranged on either side of the machine and extending into the trackways.

Tension plates 64 are arranged on the outward side of the inner length of these belts engaging the rollers of the molds and these are pressed inwardly by adjustable compression springs 65. The pressure thus exerted by the spring 65 against the belts causes them to engage the ends of the rollers of the mold carriers and said carriers are moved rapidly one at a time the length of the belts and at the end of their travel through the belt propulsion the studs 15 are brought into engagement with the ends of the spiral members 48 and 48'. These spirals are constantly rotated through the mechanism described and the studs enter the spiral grooves and are moved lengthwise of the frame with a comparatively slow movement.

While being moved throughout the length of the spiral member 48 or 48' the molds are spaced apart as shown in Figures 1 and 8. Upon leaving the ends of these spiral propelling members each mold engages the one preceding and the entire train of molds extending over the middle portion of the machine through the heat chamber are pressed tightly together with sufficient force to hold the separable sections of each mold tightly together against any expanding force that may be exerted therewithin.

At the opposite end the molds are being pressed against the spiral members 49 or 49' which are under air or hydraulic pressure and they are picked up one at a time by the revolving spirals 49 and 49'. The train of molds in between the two spirals move longitudinally according to the rate of travel of the spirals 48 and 48' and in this movement are subjected to the applied heat of the elements 59 within the heating chamber.

It is important to note that the charged molds are first advanced by the frictional belts 38 toward the rotating spirals 48 and 48' and as the stud of each mold reaches the advance end face of the spiral it will be momentarily held in pressure contact therewith and as the spiral rotates the stud will enter the spiral and a positive advance movement will be imparted to the mold.

A similar condition obtains as each mold reaches the advance end of the spirals 49 or 49', the molds being momentarily arrested with the stud in pressure contact with the end surface of the spiral until engaged and positively moved thereby.

Since spirals 49 and 49' are being constantly urged axially toward their co-operating spirals 48—48' not only will the group of molds between each set of spirals be held in positive and uniform pressure contact with each other, but it will be seen that any variance in the outside dimensions of the molds due to wear or irregularities in structure, will be compensated for by a corresponding shifting of the spirals 49—49' ensuring their grouping in closed pressure contact between the spirals, and the opening of the molds from internal pressure will be prevented.

The number of molds accommodated between the paired spirals will depend on the size of the molds and the mean spacing between the spirals of each pair. The construction thus described dispenses with the necessity of means for individually locking the molds.

The speed of travel and length of the heating chamber are proportioned in respect to the material being molded to give a sufficient time period of treatment and immediately following the heat treatment the molds are cooled off by being passed through the cooling sections within the hollow chambers.

As the molds emerge from the cooling sections they are picked up by the spirals 49, 49' and separated from their close pressure engaging contact with each other allowing the mold sections to open slightly if there is any tendency to do so.

Passing from the ends of the spirals 49, 49' the mold carriages are picked up by the friction belts 38 and are transferred rapidly to a position adjacent to the operating end discs and as the molds are pushed along by those moving thereafter the rollers 20 of the discs 18 engage the studs 15 to carry the molds around the semi-circular trackway bringing the pins 23 into engagement with the cam 24 and groove wall 25 to effect the opening of the molds to discharge the finished product and to hold them open to receive a new charge at the opposite ends of the machine.

The machine herein described provides a mechanism which will operate continuously without requiring the manipulation of heavy cumbersome molds. The timing of the heat treatment may be very accurately regulated and the production of a uniform quality of goods is ensured in addition to effecting a material reduction in the cost of the product.

Further, it will be understood that the device may be altered to suit special conditions by changing the middle section for either a shorter or longer length regulated in accordance with the type of product to be produced therein.

What I claim as my invention is:—

1. A molding machine comprising a frame having a continuous trackway, a plurality of separable molds mounted to travel in said continuous trackway and adapted during their travel to be pressed together in grouped formation to maintain a closing pressure thereon, means for applying heat to said molds for a predetermined distance of travel thereof, and means for effecting the travel of said molds, including means maintaining the molds in grouped closing pressure contact the one with the other during their passage through the zone of heat application.

2. A molding machine comprising a frame having a continuous trackway, a plurality of separable molds mounted to travel in said trackway and adapted during their travel to be pressed together in grouped formation to maintain a closing pressure thereon, means for periodically opening and closing said molds, means for advancing said molds along the trackway, and means for applying heat to said molds for a predetermined period, said advancing means including mold advancing members between which said molds are grouped during heat treatment and being relatively displaceable toward or away from each other in accordance with the over-all length of said group, and pressure applying means urging said mold-advancing members into closer relation with each other to confine the molds therebetween in positive closing pressure contact the one with the other as they are advanced by said members.

3. A molding machine comprising a frame having a continuous trackway, a plurality of sectional molds mounted to travel in said trackway, means for periodically opening and closing said molds, a heating chamber arranged throughout a portion of said trackway, means individually advancing said molds with an accelerated movement toward the heating chamber, means effecting the grouping and continuous travel of a series of the molds at a decelerated speed through said heating chamber in closing pressure engagement the one with the other, means moving the molds rapidly from closing contact at the outlet end of said heating chamber, and means receiving the molds from said last-mentioned means for moving said molds in separated relation to permit their opening and closing.

4. A molding machine comprising a frame having a continuous trackway, a plurality of individual sectional relatively movable molds mounted to travel in said trackway and adapted to be moved periodically into pressure-engaging contact to close the same against internal pressure, means for periodically opening and closing said molds, a heating chamber arranged throughout a portion of said trackway through which the molds are adapted to pass, means grouping a series of said molds and propelling same with a continuous movement through said heating chamber, means co-operating with the aforesaid means and automatically effecting a closing pressure contact between said series of grouped molds as they move continuously through said heating chamber, means for separating and propelling the molds rapidly into and out of the zone of influence of said latter means, and means for propelling the molds in definite spaced relation during their opening and closing periods.

5. A molding machine comprising a frame having a continuous trackway, a plurality of molds mounted to travel in said trackway, means for periodically opening and closing said molds, a heating chamber arranged throughout a portion of said trackway, spiral means engaging said molds to propel them through said heating chamber, spiral means slidably mounted to engage said molds being propelled by the aforesaid spiral means, and pressure means for holding the latter spiral means in pressure engagement with said molds.

6. A molding machine comprising a frame having a pair of parallelly spaced sections each having an endless trackway therein, a plurality of sectional mold members arranged between said frame sections and extending therebeyond and having bearing members engaging said trackways, a heating chamber, means arranged between said frame sections engaging said mold members to propel same along said trackway, through said chamber in closing pressure contact with each other, means frictionally engaging said molds to accelerate their advance and retreat to and from said latter means, and means for opening and closing said molds.

7. A molding machine comprising a frame having a pair of parallelly spaced sections each having an endless trackway therein, a plurality of mold members arranged between said frame sections and extending therebeyond and having bearing members engaging said trackways, a shaft journalled between said frame sections, a spiral device secured on said shaft adjacent to one end thereof, projections on said mold members adapted to be engaged by said spiral device and to be propelled thereby in said trackway, a spiral device slidably mounted on said shaft adjacent to its other end and adapted to engage the projections on said mold members, means for applying longitudinal pressure on the latter spiral means, a heating chamber enclosing the molds arranged between said spiral members, and means for opening and closing said molds at opposite ends of said heating chamber.

8. A molding machine, comprising a pair of frame sections parallelly spaced apart and each having an endless trackway therein, mold members supported in said trackways, means mounted between said frame sections and engaging said mold members to propel them longitudinally of said trackway, rotatable means mounted between said frame sections at the ends thereof for engaging said mold members to carry them around the ends of the trackways, friction belts extending longitudinally of said frame members and engaging said mold members between the aforesaid longitudinally propelling means and the end propelling means, and means for heating the molds during their longitudinal travel.

9. A molding machine, comprising a frame having a pair of parallelly spaced sections each having an endless trackway therein, members movable in said trackway having rigid mold sections, mold sections separable from said rigid mold sections and adapted during their travel to be pressed together in grouped formation to maintain a closing pressure thereon, means grouping and propelling a series of said mold members longitudinally in one direction on one of said trackways in closing pressure contact the one with the other, means for heating and cooling molds during their respective longitudinal travel, and means for opening and closing said separable mold sections at the end of each longitudinal movement.

10. A molding machine as claimed in claim 2 in which said mold advancing members comprise a pair of axially spaced spiral cams engaging projections on the molds and driven at a uniform speed, one of said spiral cams being axially slidable to vary its distance from the other cam, said pressure applying means co-operating with the slidable spiral cam to urge same toward the other cam.

11. In a molding machine the combination of a plurality of sectional mobile molds and adapted during their travel to be pressed together in grouped formation to maintain a closing pressure thereon, heating and cooling chambers through which said sectional molds are adapted to travel successively, and means for automatically grouping and advancing a series of said molds in closing pressure contact the one with the other through said heating and cooling chambers.

12. In a molding machine, the combination of a plurality of sectional molds adapted to be held closed while advanced through a heat treatment zone, means effecting the advancement of the molds, and fluid pressure controlled means co-operating with said molds and automatically applying closing pressure thereto during their movement through the heat treatment zone.

13. In a molding machine, the combination of a plurality of sectional molds adapted to be held closed while under heat treatment, means for moving said molds through a heating zone, and fluid pressure means co-operating with said latter means and applying closing pressure therethrough to said molds during their movement through the heat zone.

14. In a molding machine the combination of a plurality of sectional molds, a heating chamber, means for advancing said molds successively through said heating chamber, a slidably mounted spiral member engaging the molds and regulating their rate of outlet from said heating chamber, and a fluid actuated ram applying a constant axial pressure on said spiral member to urge said molds toward said mold-advancing means into closing pressure engagement the one with the other.

15. In a molding machine the combination with a plurality of sectional traveling molds to be heat treated and pressure closed during travel, of compensating means automatically grouping a series of said molds in uniform closing pressure contact with each other during heat treatment, said compensating means comprising operating elements spaced in the direction of travel of the molds and each operating at a predetermined speed to control the advance of the molds and being capable of automatic compensating movement relative the one to the other to provide for variation in the size of the molds accommodated therebetween.

LEWIS J. CLAYTON.